United States Patent
Ballesteros et al.

(10) Patent No.: US 10,671,277 B2
(45) Date of Patent: *Jun. 2, 2020

(54) FLOATING SOFT TRIGGER FOR TOUCH DISPLAYS ON AN ELECTRONIC DEVICE WITH A SCANNING MODULE

(71) Applicant: Datalogic USA, Inc., Eugene, OR (US)

(72) Inventors: Elva Martinez Ballesteros, Springfield, OR (US); Thomas Burke, Reno, NV (US); John McConnell, Eugene, OR (US); Jacqueline Fabbi, Junction City, OR (US)

(73) Assignee: DATALOGIC USA, INC., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/535,382

(22) PCT Filed: Dec. 16, 2015

(86) PCT No.: PCT/US2015/066156
§ 371 (c)(1),
(2) Date: Jun. 12, 2017

(87) PCT Pub. No.: WO2016/100548
PCT Pub. Date: Jun. 23, 2016

(65) Prior Publication Data
US 2018/0011631 A1 Jan. 11, 2018

Related U.S. Application Data

(63) Continuation of application No. 14/574,251, filed on Dec. 17, 2014.

(51) Int. Cl.
*G06F 3/0488* (2013.01)
*G06F 3/0481* (2013.01)
(Continued)

(52) U.S. Cl.
CPC ........ *G06F 3/04886* (2013.01); *G06F 1/1694* (2013.01); *G06F 3/0481* (2013.01);
(Continued)

(58) Field of Classification Search
None
See application file for complete search history.

(56) References Cited

U.S. PATENT DOCUMENTS

| 5,276,794 A | 1/1994 | Lamb, Jr. |
| 5,640,002 A | 6/1997 | Ruppert et al. |

(Continued)

FOREIGN PATENT DOCUMENTS

| CN | 201138562 Y | 10/2008 |
| EP | 1 674 976 A2 | 6/2006 |

(Continued)

OTHER PUBLICATIONS

International Bureau of WIPO, International Preliminary Report on Patentability, PCT/US2015/066156, dated Jun. 29, 2017, 14 pp.

(Continued)

*Primary Examiner* — Jennifer N To
*Assistant Examiner* — Joseph R. Burwell
(74) *Attorney, Agent, or Firm* — Stoel Rives LLP

(57) ABSTRACT

A portable electronic device (100) having a touch screen (112) with a floating soft trigger icon (175) for enabling various functions of the electronic device (100), such as bar code reading, capturing RFID data, capturing video and images, calling applications, and/or placing phone calls. The floating trigger icon (175) is displayed on the touch screen (112) to enable easy identification and access of the trigger icon (175). The trigger icon (175) may be selected via application of any one of various unique control gestures (200, 210, 220, 230, 240, 250, 260) to configure the electronic device (100). Based on the selected mode or function (Continued)

of the device (100), the trigger icon (175) may alter its appearance to facilitate use of the device (100). The operation and functionality of the trigger icon (175) may be programmed to customize operation of the device (100).

20 Claims, 11 Drawing Sheets

(51) Int. Cl.
G06K 7/10 (2006.01)
G06K 7/14 (2006.01)
G06K 9/00 (2006.01)
G06F 1/16 (2006.01)
G06F 3/0484 (2013.01)

(52) U.S. Cl.
CPC ...... *G06F 3/04817* (2013.01); *G06F 3/04883* (2013.01); *G06K 7/10366* (2013.01); *G06K 7/1413* (2013.01); *G06K 9/00355* (2013.01); *G06F 3/04842* (2013.01); *G06F 2203/04801* (2013.01); *G06F 2203/04804* (2013.01)

(56) References Cited

U.S. PATENT DOCUMENTS

| | | | |
|---|---|---|---|
| 5,677,710 A * | 10/1997 | Thompson-Rohrlich | G06F 3/04883 345/173 |
| 7,844,915 B2 | 11/2010 | Platzer et al. | |
| 8,035,849 B2 | 10/2011 | Lapstun et al. | |
| 8,308,069 B2 | 11/2012 | Barber et al. | |
| 8,467,991 B2 | 6/2013 | Khosravy et al. | |
| 8,610,730 B1 | 12/2013 | Li et al. | |
| 8,739,035 B2 | 5/2014 | Trethewey | |
| 8,803,814 B2 | 8/2014 | Andolina | |
| 9,046,943 B1 | 6/2015 | Kuhne | |
| 2003/0001899 A1 | 1/2003 | Partanen et al. | |
| 2003/0193481 A1 | 10/2003 | Sokolsky | |
| 2005/0004844 A1 | 1/2005 | Attia | |
| 2005/0022130 A1* | 1/2005 | Fabritius | G06F 3/038 715/739 |
| 2005/0178832 A1 | 8/2005 | Higuchi | |
| 2005/0223341 A1 | 10/2005 | Repka | |
| 2005/0278647 A1 | 12/2005 | Leavitt et al. | |
| 2006/0026521 A1 | 2/2006 | Hotelling et al. | |
| 2006/0138232 A1 | 6/2006 | Hammerslag et al. | |
| 2006/0156247 A1 | 7/2006 | McCormack et al. | |
| 2007/0133876 A1 | 6/2007 | Chande et al. | |
| 2007/0226713 A1 | 9/2007 | McGowan et al. | |
| 2008/0267537 A1 | 10/2008 | Thuries | |
| 2009/0027421 A1 | 1/2009 | Servan-Schreiber et al. | |
| 2009/0097077 A1 | 4/2009 | Swartz et al. | |
| 2009/0178008 A1 | 7/2009 | Herz et al. | |
| 2010/0214218 A1 | 8/2010 | Vaisanen et al. | |
| 2011/0215146 A1 | 9/2011 | Shams | |
| 2011/0285636 A1 | 11/2011 | Howard et al. | |
| 2011/0290871 A1 | 12/2011 | Cameron | |
| 2012/0066600 A1 | 3/2012 | Nickel | |
| 2012/0086662 A1 | 4/2012 | Ashikawa | |
| 2012/0156662 A1 | 6/2012 | Mital et al. | |
| 2013/0053007 A1 | 2/2013 | Cosman et al. | |
| 2013/0105565 A1 | 5/2013 | Kamprath | |
| 2013/0176264 A1 | 7/2013 | Alameh | |
| 2013/0181050 A1 | 7/2013 | McConnell | |
| 2013/0185788 A1 | 7/2013 | Picard | |
| 2013/0227472 A1 | 8/2013 | Sosinski | |
| 2013/0265235 A1 | 10/2013 | Cai et al. | |
| 2014/0184524 A1 | 7/2014 | Schiefer et al. | |
| 2014/0184721 A1 | 7/2014 | Zhang et al. | |
| 2014/0204035 A1 | 7/2014 | Chang | |
| 2014/0215542 A1 | 7/2014 | Terpe | |
| 2014/0237420 A1 | 8/2014 | Song et al. | |
| 2014/0267000 A1 | 9/2014 | Yuen et al. | |
| 2014/0313130 A1 | 10/2014 | Yamano et al. | |
| 2014/0365256 A1 | 12/2014 | Duff | |
| 2014/0375577 A1 | 12/2014 | Yeh et al. | |
| 2015/0011204 A1 | 1/2015 | Seo et al. | |
| 2015/0019413 A1 | 1/2015 | Lazarus | |
| 2015/0058318 A1 | 2/2015 | Blackwell et al. | |
| 2015/0067529 A1 | 3/2015 | Lee et al. | |
| 2015/0106731 A1 | 4/2015 | Matas et al. | |
| 2015/0143285 A1 | 5/2015 | Wei et al. | |
| 2015/0160832 A1 | 6/2015 | Walkin et al. | |
| 2015/0178523 A1 | 6/2015 | Gelay et al. | |
| 2015/0193031 A1 | 7/2015 | Tilak et al. | |
| 2015/0277728 A1 | 10/2015 | Kuznetsov | |
| 2015/0323997 A1 | 11/2015 | Haist et al. | |
| 2016/0124931 A1 | 5/2016 | Fan et al. | |
| 2016/0132983 A1 | 5/2016 | Qin | |

FOREIGN PATENT DOCUMENTS

| | | | |
|---|---|---|---|
| JP | 2002193922 A | 7/2002 | |
| JP | 2005-267627 A | 9/2005 | |
| JP | 2005-284639 A | 10/2005 | |
| KR | 2006-0103378 A | 9/2006 | |
| KR | 2007-0074016 A | 7/2007 | |
| KR | 2012-0001164 A | 1/2012 | |
| WO | 2008030972 A1 | 3/2008 | |
| WO | WO 2012-112216 A2 | 8/2012 | |

OTHER PUBLICATIONS

International Search Report & Written Opinion, International Application No. PCT/US2013/021004, dated Apr. 25, 2013, pp. 11.
Rohs et al., "Using Camera-Equipped Mobile Phones for Interacting with Real-World Objects." 2004.
Yang et al., "A System of QR Barcode Recognition Based on Mobile Phone," Applied Mechanics and Materials 241:1724-1727, 2012.
Mixerbox, Inc., "QR Code Reader & Barcode Scanner (Free Download)," https://itunes.apple.com/us/app/qr-code-reader-barcode-scanner/id903799541?mt+8, Dec. 9, 2014, 2 pp.
Ritchie, René, "How to Rearrange App Icons to Customize Your iPhone or iPad Home Screen," http://www.imore.com/how-to-rearrange-app-icons-customize-iphone-ipad-home-screen, Dec. 21, 2010, 8 pp.
Google, "Android 2.3.4 User's Guide," May 20, 2011, pp. 1 and 273-280).
International Searching Authority, International Search Report and the Written Opinion, PCT/US2015/066156, dated Aug. 17, 2016, 21 pp.

* cited by examiner

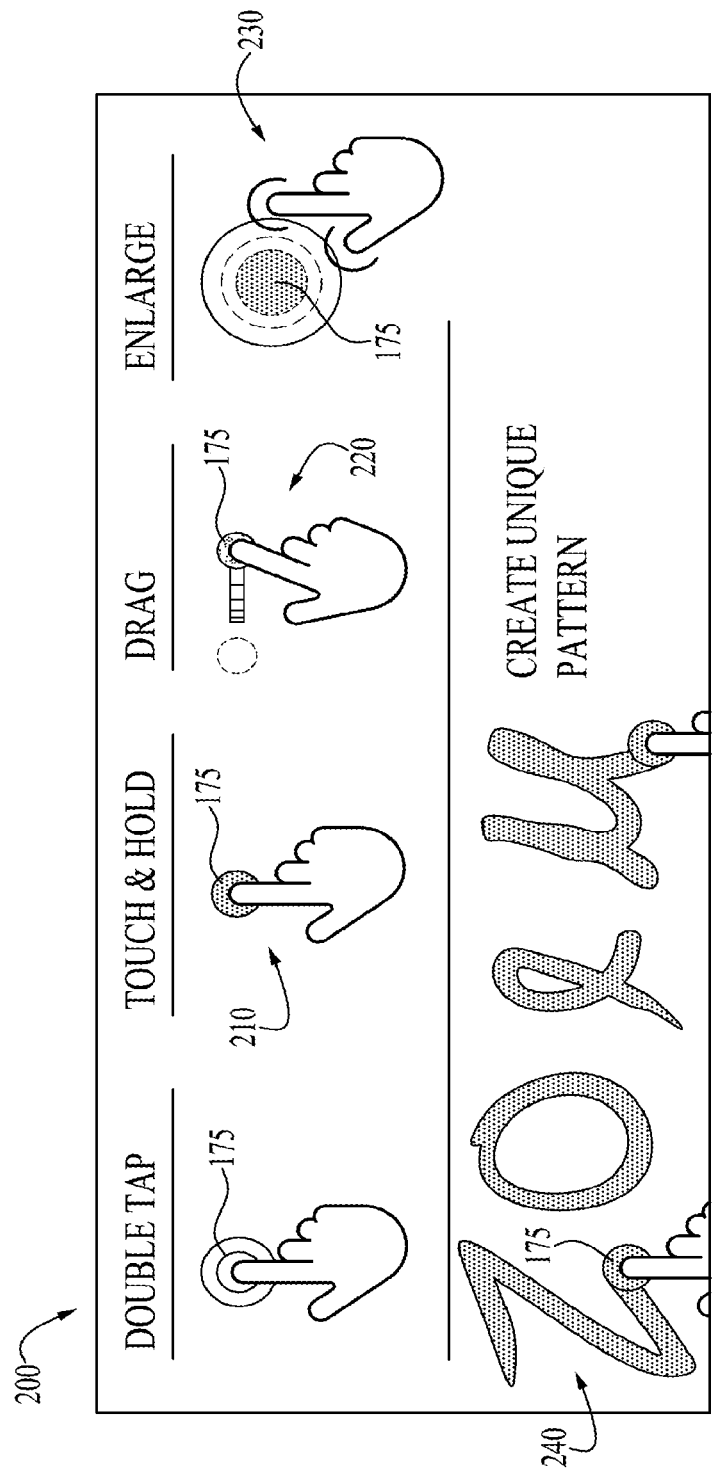

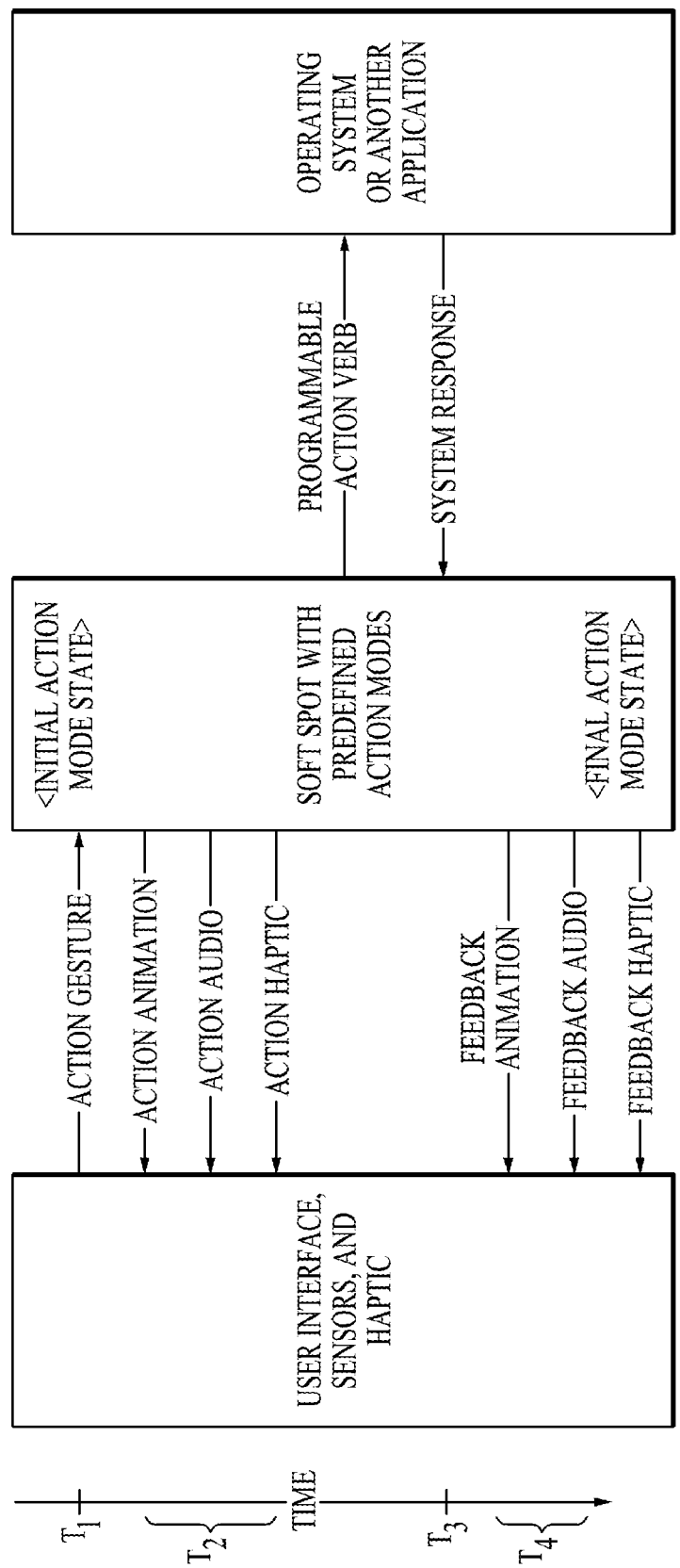

FLOATING SOFT TRIGGER FOR TOUCH DISPLAYS ON AN ELECTRONIC DEVICE WITH A SCANNING MODULE

BACKGROUND

The field of the disclosure relates generally to systems and methods for capturing and reading data using an electronic device. More particularly, the field of the disclosure relates to such electronic devices having a touch screen interface for enabling and configuring various modes and functions of the electronic device, such as reading optical codes, processing RFID tags, capturing videos and images, and accessing and using other features of the electronic device.

Optical reading systems are widely used to read data in the form of optical codes or other encoded symbols printed on various objects. These systems may be used in a wide variety of applications, such as inventory control and point-of-sale transactions in retail stores. Barcodes are just one example of the many types of optical codes in use today. The most common barcodes are one-dimensional or linear optical codes, where the information is encoded in one direction—the direction perpendicular to the bars and spaces. For example, one-dimensional (1D) barcode symbologies may include Code 128, Code 29, Interleaved 2 of 5, matrix 2 of 5, Universal Product Code (UPC), Extended Code 39, Code 93, UCC 128, Codabar, EAN/JAN, MSI, Zip+4, Pharmacode 39, RSS, Standard 2 of 5, Trioptic, DPBC POSTNET. Higher-dimensional optical codes, such as, two-dimensional matrix codes (e.g., MaxiCode) or stacked codes (e.g., PDF 417), which are also sometimes referred to as "two-dimensional barcodes," are also used for various purposes. Based on the type of barcode label that is being used, an appropriate set of decoding parameters is used to accurately read and process the data.

Typically, a one-dimensional barcode label comprises a series of parallel dark bars of varying widths with intervening light spaces, also of varying widths. The information encoded in the barcode label is represented by the specific sequence of bar and space widths. Optical reading systems may employ an optical reader that illuminates the barcode label and detects light reflected from the bars and spaces of the code. One common optical reader is a flying spot scanner in which a source of illumination, such as a laser or LED, is moved across the barcode while a photodetector in the optical reader monitors the reflected or backscattered light. After the barcode data is received by the optical reader, the optical reader may decode the barcode data and store it or transmit it to another device for storage.

Another type of data reader is an imaging reader such as a CCD (charge coupled device) or CMOS (complimentary metal oxide semiconductor) in which an entire line of the barcode image or a two-dimensional image of a scan region is focused onto a detector array. The imaging reader typically includes a light source to illuminate the barcode to provide the required signal response. Once the signal has been received for the entire read region, it may be processed and decoded.

Yet another type of data reader does not use optical barcodes, but instead reads electronic tags using radio waves, such as a radio-frequency identification (RFID) reader. An RFID system typically employs at least two components, a "transponder" or "tag" which is attached to a physical item to be identified, and a "reader" which sends an electromagnetic signal to the transponder and then detects a response. Typically, the reader emits an RF signal, which is received by the transponder, after the transponder comes within an appropriate range. In response, the transponder then sends its information via a modulated RF signal back to the reader. The reader detects this modulated signal, and can identify the transponder by decoding the modulated signal. After identifying the transponder, the reader can either store the decoded information or transmit the decoded signal to a computer or other device.

Currently, data reading and other electronic devices with multiple reading modes and action functions are available, where the devices are capable of capturing and decoding optical barcode labels and RFID tags, and may also have other suitable functions, such as capturing images or videos, providing a screen to capture signatures, and/or enabling voice or texting options. Such electronic devices may be useful in an environment where objects may contain mixed barcode symbology and RFID tags, such as in a retail store or packaging facility, or where there is a need for a multi-purpose electronic device that may also capture images or videos, or provide features for enabling phone calls or other functions.

Typically, such electronic devices include a physical trigger button arranged on the housing of the device to activate some device functions, and also include separate individual buttons or selectable icons for enabling and activating other functions of the electronic device. The present inventor has recognized certain disadvantages of such electronic devices. For example, providing a physical button or trigger on a touch screen electronic device tends to restrict the easy handheld use of the device and/or requires the device to be used in a specific orientation. In addition, a physical trigger button adds to the bulk and size of the device.

Accordingly, the present inventors have recognized a need for a multi-purpose electronic device that allows a user to easily toggle and enable between various data capture modes without a physical trigger button. In addition, the present inventors have recognized a need for such a device with a single trigger to enable and activate various different features and functions of the electronic device (in addition to data reading) to maintain an overall streamlined design. Finally, the present inventors have also recognized a need for such an electronic device with an improved display interface that simplifies data capturing transactions and provides details of a data capture transaction, such as an indication of whether the transaction was successful, a presentation of the information gathered during the transaction, and a display of alerts or issues with the transaction to help troubleshoot potential problems.

Additional aspects and advantages of these and other embodiments will be apparent from the following detailed description, which proceeds with reference to the accompanying drawings. It should be understood that the drawings depict only certain example embodiments and are not to be considered as limiting in nature.

BRIEF DESCRIPTION OF THE DRAWINGS

FIG. 5 is a chart illustrating example control gestures that may be applied to configure the portable electronic device of FIG. 2.

FIGS. 14 and 15 are flow charts illustrating example methods for configuring and customizing the portable electronic device.

DETAILED DESCRIPTION OF PREFERRED EMBODIMENTS

Figure 1:
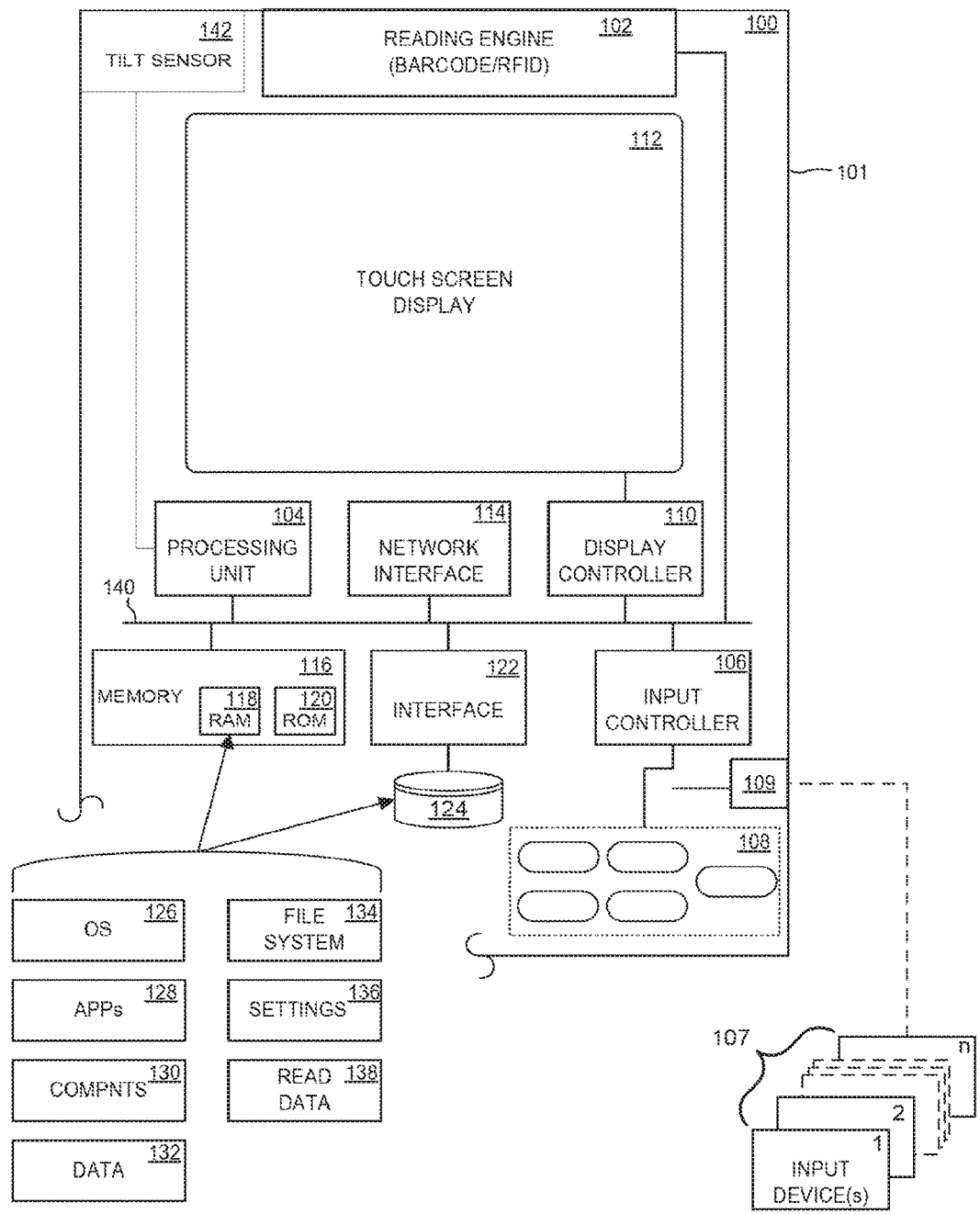
FIG. 1 is a block diagram of a portable electronic device with a touch screen display, according to one embodiment.

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Certain embodiments may be capable of achieving various advantages, including one or more of the following: (1) providing a portable electronic device with touch screen, motion-sensing, and/or toggling capabilities for quickly and easily activating various reader modes based on the barcode symbology or presence of RFID tags in an object, and for activating various other functions of the portable electronic device; (2) providing a programmable portable electronic device capable of detecting and responding to a variety of programmed control gestures for toggling between various reading modes and configuration settings of the device; (3) providing a portable electronic device with an easily accessible and multi-functional activation trigger; and (4) providing a portable electronic device with a programmable and customizable multi-functional activation trigger.

In the following description of the figures and any example embodiments, the system may be referred to in conjunction with use at a retail establishment. It should be understood that such use is merely one example use for such a system. Other uses for a system with the characteristics and features described herein may be implemented, for example, in an industrial location such as a parcel distribution (e.g., postal) station or for processing inventory, as well as other suitable uses. In addition, certain embodiments may refer to the portable electronic device as a data reader operable for capturing barcodes or RFID data from items. It should be understood that this is merely one example embodiment and use of a portable electronic device with the features and functionalities described herein. In other embodiments, the portable electronic device may be used for other purposes, such as for recording and processing videos or images, for handling and processing insurance claims, documenting and handling service and repair issues, and other suitable uses. Accordingly, while the embodiments may reference use of the electronic device for data reading, this embodiment is merely one example used for convenience purposes only and not meant to be limiting.

Collectively, FIGS. 1-15 illustrate various embodiments of a portable electronic device 100 that may be used to perform a variety of functions, such as read and process an optical label or RFID tag on an item during a checkout process, such as at a retail store or supermarket. In other embodiments, the portable electronic device 100 may be used for other functions, such as to capture videos or other data, receive and store inventory information, and/or use as a virtual joystick for a variety of applications.

With general reference to the figures, the portable electronic device 100 includes a touch screen 112 that may display information 150 thereon, such as application icons, images, text, or other suitable information. Along with the information 150, the touch screen 112 further displays a floating trigger icon 175. In some embodiments, the floating trigger icon 175 may overlay at least a portion of the information 150 on the touch screen 112, or may be positioned in a free-space of the touch screen 112 (e.g., a region where no information 150 is displayed). As is further described in detail below, the floating trigger icon 175 may be selected by a user to configure an action, such as a data reading mode, of the electronic device 100. To select a particular action or function, the operator or user may apply any one of a variety of unique control gestures 200 onto the touch screen 112 at a location of the touch screen 112 where the trigger icon 175 is displayed. Once the control gesture is applied to the floating trigger icon 175 and detected by the electronic device 100, the device 100 is configured to allow the operator to perform the selected action.

For example, in one embodiment, the operator may apply a control gesture 200, such as a swipe in a particular direction, a press and hold, a single or double tap (see FIG. 5) onto the trigger icon 175 to configure or set a data reader mode of the electronic device 100 for a particular label or tag type, such as a one-dimensional barcode, two-dimensional barcode, or RFID tag. Once the control gesture has been received and processed by the electronic device 100, the device 100 configures an appropriate reading engine 102 in accordance with the chosen reader mode so that the device 100 may be used to properly capture the target data. Once the item has been processed, the user may thereafter reconfigure the device 100 to a different reader mode, if necessary, by applying a different control gesture to the trigger icon 175. Alternatively, additional control gestures may be applied to the trigger icon 175 to trigger or configure other functions of the electronic device 100 as desired. For example, after the data has been captured, a different control gesture may be applied to the trigger icon 175 to load and use software applications for reviewing and/or processing the captured data. Additional details of these and other embodiments of the electronic device 100 are described herein with reference to the figures.

FIG. 1 illustrates a block diagram of the portable electronic device 100, such as a barcode reader, RFID reader, industrial Portable Data Terminal, mobile phone, tablet, or a multi-mode data reader (a multi-mode data reader being capable of reading optical codes, RFID tags, and other data types), according to one embodiment. With reference to FIG. 1, the electronic device 100 includes a housing 101 suitable for protecting components (as discussed in detail below) of the electronic device 100 therein and for supporting additional components, such as a keyboard 108 and a touch screen display 112, on an exterior surface of the housing 101. The housing 101 is preferably compact and suited for portability and hand-held operation of the electronic device 100.

The portable electronic device 100 includes one or more reading engines 102, such as an optical label (or barcode) scanning engine, an RFID reading engine, or a multi-mode data reader capable of reading both/multiple data types. The reading engine 102 may read barcode symbols from a physical object, capture information from an RFID tag, and process captured images or other data. In some example embodiments, the reading engine 102 may include a laser barcode scan engine available from Datalogic ADC, Inc. or other manufacturers. In other embodiments, the reading engine 102 may include an RFID reading engine available from Datalogic ADC, Inc., or other manufacturers. As used herein, reading engines 102 may also encompass laser scanners, imaging scanners (such as CMOS or CCD-based imagers), cameras, and/or image sensors.

The portable data reader 100 may include a processing unit 104. The processing unit 104 may be any of various suitable commercially available processors or other logic machine capable of executing instructions. In other embodiments, suitable dual microprocessors or other multi-processor architectures may also be employed as the processing unit 104.

A standard input controller 106 may be provided to receive user input from a keyboard/keypad 108, a stylus or other pointing device (not shown), or other wired/wireless input devices. The input controller 106 may comprise a universal interface driver application specific integrated circuit (UIDA) or other suitable circuits. In some embodiments, other input devices 107 may be included, such as a microphone, digital camera, fingerprint scanner, touchpad, trackball, and tablet. While the input devices 107 may be integrated into the portable electronic device 100 and coupled to the processing unit 104 via the input controller 106, the input devices 107 may also connect via other interfaces, such as one or more connector(s) 109. The connector 109 may include one or more data interfaces, bus interfaces, wired or wireless network adapters, or modems for transmitting and receiving data. Accordingly, the input controller 106 may include one or more of hardware, software, and firmware to implement one or more protocols, such as stacked protocols along with corresponding layers, such as for example application layers (e.g., HTTP), transport layers (e.g., TCP), network layers (e.g., IP), and link layers (e.g., Ethernet). According to one embodiment, the connector 109 functions as a serial port (e.g., RS232). However, the connector 109 may also support other interfaces, such as a Universal Serial Bus (USB) port, an Ethernet port, a parallel port, an IEEE 1394 serial port, or an IR interface. The input controller 106 may also support various wired, wireless, optical, and other communication standards.

The portable electronic device 100 may present data, prompts, and otherwise communicate with a user via one or more touch screen display devices 112, such as an integrated liquid crystal display (LCD), an organic light-emitting diode (OLED), or other suitable display with touch screen capabilities. The touch screen 112 may include one or more sensors (not shown) for detecting a user's touch via a finger, stylus, or other device. A display controller 110 may drive the display device 112 and control its features.

In some embodiments, the portable electronic device 100 may further include a tilt sensor or accelerometer 142 in communication with the processing unit 104 and configured to detect whether the portable electronic device 100 has been rotated, tilted, or shaken. In some embodiments, the tilt sensor 142 may be in communication with or electronically coupled to the display controller 110 such that when the tilt sensor 142 is activated (e.g., the electronic device 100 is rotated), the display controller 110 triggers a message to display on the touch screen display 112 notifying the user that the tilt sensor 142 has been activated.

The portable electronic device 100 may also include a network interface 114 to communicate with one or more other devices, such as a server, a host computer, or a point-of-sale terminal via an external network (not shown). For example, data gathered by, or decoded by, the portable electronic device 100 may be passed along to a server. The network interface 114 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), and USB. A wireless connection may use low or high powered electromagnetic waves to transmit data using any wireless protocol, such as Bluetooth™, IEEE 802.11b (or other WiFi standards), infrared data association (IrDa), and radio frequency identification (RFID). In addition, a modem module (not shown) or Ethernet module (not shown) may be coupled to the connector 109 to facilitate a WAN networking environment.

The portable electronic device 100 further includes a memory 116, which may be implemented using one or more standard memory devices. The memory devices may include, for instance, RAM 118, ROM 120, and EEPROM devices, and may also include magnetic or optical storage devices, such as hard disk drives, CD-ROM drives, and DVD-ROM drives. The portable electronic device 100 may also include an interface 122 coupled to an internal hard drive 124. Interface 122 may also be coupled to removable memory, such as flash memory, a magnetic floppy disk drive, an optical disk drive, or another drive. Further, the interface 122 (and/or input controller 106) may be configured for external drive implementations, such as over a USB, IEEE 1194, or PCMCIA connection.

In one embodiment, any number of program modules may be stored in one or more drives 124 and RAM 118, including an operating system 126, one or more application programs 128, other program modules 130 (such as instructions to implement the methods described herein and/or associate specific control gestures with specific functions and/or applications), data 132, file system 134, settings 136, and read data 138. All or portions of the program modules may also be cached in RAM 118. Any suitable operating system 126 may be employed, such as Windows Embedded CE, Windows Embedded Handheld, Windows Desktop, Android, Linux, iOS, MacOS, or other commercially available or proprietary operating systems capable of supporting a touch screen interface.

The memory 116, the internal hard drive 124, or both, may also store a number of settings 136 for the portable electronic device 100, which may include various symbology settings, device settings (e.g., user-interface), and network settings. Additionally, the memory 116, the internal hard drive 124, or both, may store read data 138 (e.g., symbols and information read from barcodes and RFID tags) obtained by the reading engine 102, images captured using the electronic device 100, or other data. Any of the foregoing may be stored within, or indexed by, a file system 134, which may be managed by the operating system 126.

The above-described components, including the reading engine 102, processing unit 104, input controller 106, display controller 110, network interface 114, memory 116, and interface 122, may be interconnected via a bus 140. While a bus-based architecture is illustrated in FIG. 1, other types of architectures are also suitable (e.g., one or more components may be directly coupled to one another). While the illustrated embodiment depicts one possible configuration of a portable electronic device 100, it should be recognized that a wide variety of hardware and software configurations may be provided. For example, other versions of the portable electronic device 100 may have fewer than all of these components or may contain additional components.

FIGS. 2-15 collectively illustrate various example embodiments and uses of the electronic device 100. With reference to the figures, the following sections discuss additional features and functions of the electronic device 100, and its example use as a multi-mode data reading device. In certain example embodiments, the following disclosure may associate specific control gestures with certain reading modes or other functionalities of the electronic device 100. It should be understood that the selected pairing of control gesture(s) and features of the device 100 are for example purposes only and not meant to limit the scope of the disclosure. As further described in detail below, the control gestures and functions of the device 100 may be programmed in a variety of configurations as desired by a specific operator.

Figure 2:
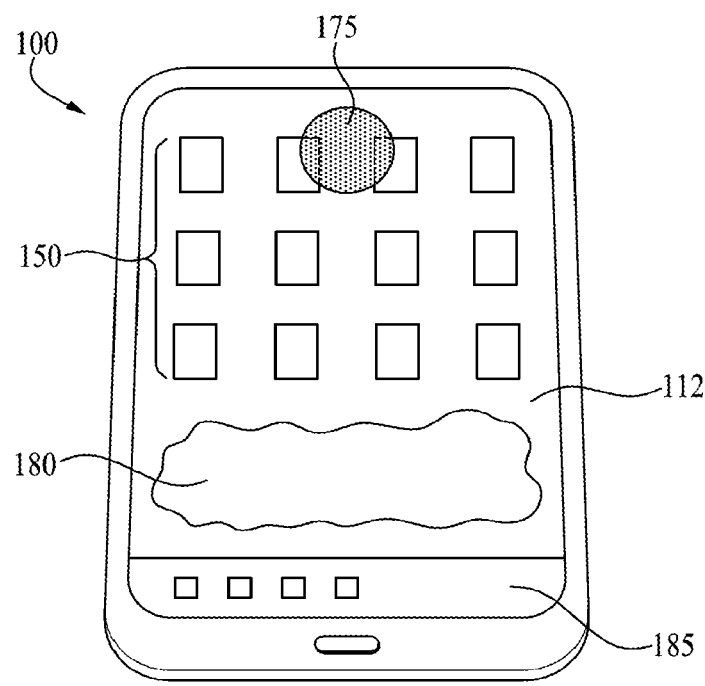
FIG. 2 illustrates a portable electronic device with a floating trigger icon overlaying information on the touch screen display, according to one embodiment.

With particular reference to FIG. 2, the electronic device 100 includes a touch screen 112 that displays information 150 thereon, such as application icons, images, text, or other suitable information. Along with the information 150, the touch screen 112 also displays a floating trigger icon 175. As is described in further detail below, a position of the floating trigger icon 175 may be selected by the user, and/or may be automatically determined by the electronic device 100 in accordance with programmed instructions. Preferably, the floating trigger icon 175 overlays at least a portion of the information 150 on the touch screen 112, so that the trigger icon 175 is always "on top" of the information 150 on the touch screen 112.

For example, in one embodiment, the floating trigger icon 175 may be positioned at a free-space or free region of the touch screen 112 (i.e., a region where no information 150 is displayed) or at a minimal-use" region (not shown) of the touch screen 112 (i.e., a region which is most free of other information 150). In such embodiments, the display controller 110 (or other system of the electronic device 100) may evaluate the pixel usage of the touch screen 112 based on the information 150 displayed thereon. Based on the pixel usage, the display controller 110 determines a home region 180 (e.g., the region with the smallest pixel usage) on the touch screen 112 for displaying the floating trigger icon 175.

Once the home region 180 is determined, the display controller 110 displays the floating trigger icon 175 at or near the home region 180 to maintain the floating trigger icon 175 at a position where it is easily accessible and quickly discernible by the operator. The display controller 110 may periodically reevaluate the pixel usage of the touch screen 112 and reposition the floating trigger icon 175 automatically in response to changes in the position of the information 150. In some embodiments, after the display controller 110 has determined the home region 180, the operator may lock the floating trigger icon 175 at that position if it is a desirable position for the user (e.g., the position is easy to locate, the trigger icon is clearly visible, distinguishable from other information 150 on the screen 112, and comfortable to access).

In still other embodiments, the floating trigger icon 175 may be automatically positioned on the screen 112 based on the selected function or reading mode of the portable electronic device 100. For example, when the electronic device 100 is in a data reading mode (e.g., barcode reading or RFID reading), the floating trigger icon 175 may be automatically positioned at a location that is most convenient and intuitive to the user, such as located at the bottom center, bottom left, or bottom right of the screen 112, or other location that is easy to access while holding the device or easy to find on a screen that may be crowded with other information 150. Alternatively, the operator may program the display controller 110 (or other program of the electronic device 100) to automatically position the floating trigger icon 175 at any desired location on the touch screen 112 for a selected reader mode or function of the portable electronic device 100 so that the floating trigger icon 175 is easy to access and activate for the operator.

In yet other embodiments, the display controller 110 may be in communication with the accelerometer 142. In such embodiments, when the device 100 is tilted or rotated, the accelerometer 142 may send a signal to the display controller 110. Upon receiving the signal, the display controller 110 may automatically reposition the floating trigger icon 175 on the touch screen 112 to a corresponding position. For example, with reference to FIGS. 2 and 3, when the electronic device 100 is in a portrait setting (FIG. 2), the trigger icon 175 may be positioned at the upper center portion of the screen 112. When the accelerometer 142 detects that the device 100 has been rotated to a landscape setting (FIG. 3), the display controller 110 may automatically reposition the trigger icon 175 on a corresponding upper center portion of the screen 112. In some embodiments, the display controller 110 may or may not reposition the information 150 on the screen 112. Regardless of the orientation of the screen 112, the trigger icon 175 preferably remains overlaid on the underlying information 150.

In still other embodiments, the operator may program the display controller 110 or other controller of the electronic device 100 to set default location preferences for the soft trigger 175. In addition, the operator may program the electronic device 100 to select the manner in which the soft trigger re-positions itself. For example, the operator can set instructions regarding automatically repositioning the soft trigger 175 based on pixel count/usage, based on tilting or rotating the device 100, and/or based on the reading mode or function that is currently active on the device 100. Alternatively, the operator can set instructions to lock the display position of the soft trigger 175, such as by disregarding rotation of the device 100 (e.g., rotation of the device 100 does not alter the position of the soft trigger 175).

Figure 3:
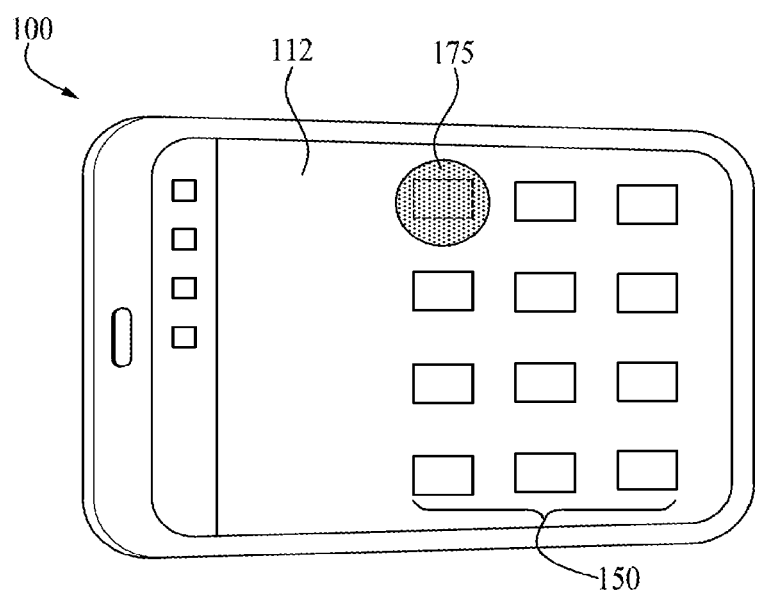
FIG. 3 is the portable electronic device of FIG. 2 illustrating the floating trigger icon on a different region of the touch screen display when the device is rotated.
Figure 4:
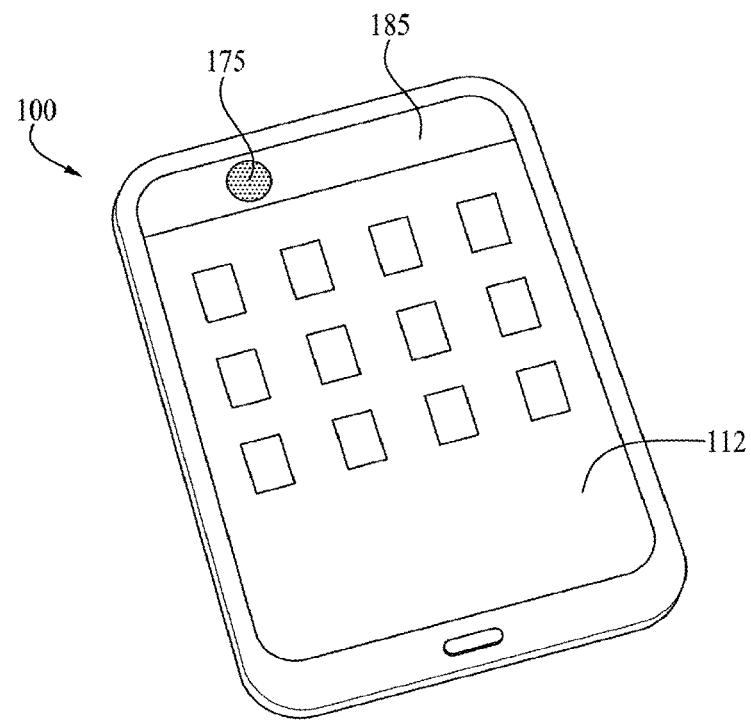
FIG. 4 is an example embodiment of a portable electronic device with the floating trigger icon parked in a status bar of the touch screen display.
Figure 6:
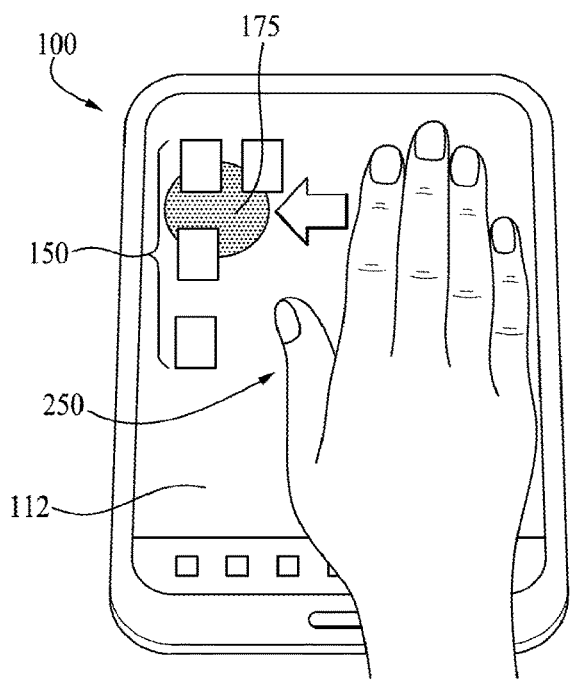
FIG. 6 illustrates another example control gesture that may be applied to move the floating trigger icon according to one embodiment.

As illustrated in FIGS. 2 and 3, the trigger icon 175 may be transparent or semi-transparent so that it partially obscures the desktop or interface display of the touch screen 112 to allow the operator to view the underlying information 150 to facilitate operation of the device 100. In other embodiments, the trigger icon 175 may instead be solid so that it obscures most (or all) of the underlying information 150. The appearance of the trigger icon 175 may take any one of a variety of suitable shapes, such as a circle, a dot, a pointer, a star, or other shape selected/programmed by the user. Preferably, the trigger icon 175 is of a shape and color that stands out against the desktop or interface display of the touch screen 112 so that it is easily identifiable and accessible by the operator. In some embodiments, the appearance and/or color of the trigger icon 175 may change as the information 150 on the touch screen 112 changes so that the trigger icon 175 appears as the dominant feature on the touch screen 112. For example, the display controller 112 may determine a color and/or appearance of the trigger icon 175 based on the primary color(s) and/or appearance(s) of the information 150 displayed on the screen 112. If the information 150 is primarily displayed in brighter colors, the display controller 112 may select a darker color for the trigger icon 175 or vice versa. In other embodiments, the display controller 112 may limit or restrict the color(s) and/or appearance(s) of the icons and other information 150 on the screen 112 to carve out specific colors/appearances for the trigger icon 175.

As mentioned previously, the floating trigger icon 175 preferably overlays the information 150 displayed on the touch screen 112. In some embodiments, the trigger icon 175 may be hidden, shrunk, enlarged, and/or moved to expose the underlying icons or other information 150 on the touch screen 112 to allow the user to perform other actions using the electronic device 100. To manipulate the trigger icon 175, the operator may apply any one of a plurality of unique control gestures (see examples illustrated in FIGS. 5 and 6). For example, the trigger icon 175 may be enlarged or shrunk on the display screen 112 by applying a two-finger gesture 230 and sliding the fingers apart (to enlarge) or sliding the fingers closer together (to shrink) the size of the trigger icon 175.

In another embodiment, a different control gesture 250 may be used to hide the floating trigger icon 175 underneath the information 150 on the display screen 112 of the electronic device 100. For example, with reference to FIG. 6, the user may place a hand on the display screen 112 and make a sweeping gesture from right-to-left (or toward any other direction on the touch screen 112) to hide/park the floating trigger icon 175 underneath the information 150. In such configuration, the operator may more easily access the icons or other information 150 on the display screen 112. The operator may thereafter apply a different unique control gesture to reactivate and reposition the trigger icon 175 over the information 150. For example, the operator may apply the touch-and-hold control gesture 210 (or any other suitable gesture).

In other embodiments, the trigger icon 175 may be selected and moved by applying a different unique control gesture 200 onto the touch screen 112 at a location where the trigger icon 175 is displayed. For example, with reference to FIG. 5, the operator may double tap the trigger icon 175 to hide the icon 175 or move the trigger icon 175 to a status bar or docking area 185 (see FIG. 4).

In other embodiments, the trigger icon 175 may also be selected and moved from a first region on the touch screen 112 at which the trigger icon 175 is displayed to a different second region of the touch screen 112. In one example operation, the trigger icon 175 may be selected by applying a first control gesture 210 (e.g., a touch and hold), and then dragged on the touch screen 112 to the second region by applying a second control gesture 220 (e.g., a drag motion). These control gestures 200 may be performed to move the trigger icon 175 to a different location such as to allow unrestricted access to the underlying information 150, or to reposition the trigger icon 175 to a more desirable location to facilitate operability of the electronic device 100. For example, the trigger icon 175 may be moved away from a data entry zone on the touch screen 112 to allow the user to enter data into the electronic device 100. Once the data has been entered, the user may again select the trigger icon 175 and reposition it. As another example, the trigger icon 175 may be moved to the status bar 185 during a video capture mode to allow the operator to view the video on a full screen 112.

Preferably, the selected position of the trigger icon 175 remains locked on the display 112 until the user applies another control gesture 200 to select and move the trigger icon 175. For example, if the trigger icon 175 is minimized or hidden during use of the electronic device 100, the trigger icon 175 is returned to its position before it was minimized or hidden when the user against selects the trigger icon 175. Similarly, when the device 100 is powered off and powered on again, the trigger icon 175 will remain unchanged.

As described previously, the trigger icon 175 also provides an access point for allowing the operator to configure various modes and features of the electronic device 100. The following section describes an example operation of the electronic device 100 used in a data reading environment to capture barcodes, RFID tags, or other data. It should be understood that data reading functions are only one example use for the electronic device 100 with the features and characteristics described herein.

With particular reference to FIGS. 2 and 5, the floating trigger icon 175 may be selected by a user to configure an action (such as a particular data reading mode, a video capture mode, a data entry mode, and/or a virtual joystick mode) of the electronic device 100. To configure a particular reading mode for the electronic device 100, the operator may apply any one of a variety of unique control gestures 200 (e.g., a unique pattern, a swipe in a particular direction, a press and hold, a single or double tap) onto the floating trigger icon 175. With reference to FIG. 5, the control gestures 200 may include any gesture, such as a single or multi-touch gesture, or any of a variety of unique patterns 240. For example, the operator may press and hold the floating trigger icon 175 and perform a single finger motion on the touch screen display 112 in the shape of the letter "R" to configure the electronic device 100 in an RFID reader mode. Similarly, the operator may move the floating trigger icon 175 in the shape of a "D" or an "S" to configure the electronic device 100 in a barcode scanner mode.

Once the control gesture has been received and processed by the electronic device 100, the device 100 configures the reading engine 102 in accordance with the chosen reader mode so that the device 100 may be used to properly capture the target data. In other embodiments, the operator may instead select the data reading mode using the keyboard 108 or other physical buttons, prompts, or other features of the electronic device 100.

Once the data reading mode has been selected and the electronic device 100 configured with the appropriate reading engine 102, the color and/or digital appearance of the floating trigger icon 175 may be altered to visually indicate the selected data reader mode (or other function) to the operator. For example, the floating trigger icon 175 may be a first color when a barcode reading mode is selected, and a second color when an RFID reading mode is selected. Alternatively, or in addition, the floating trigger icon 175 may alter color and/or appearance to indicate to the user that the floating trigger icon 175 may be used as a trigger to initiate the scan or reading event.

In some embodiments, the trigger icon 175 may be altered with a label or image icon that indicates the selected data reader mode or function. For example, when the electronic device 100 has been configured with a barcode reading engine, the soft trigger icon 175 may include the text "BARCODE" or "SCAN" displayed therewith, such as in a central portion of the displayed trigger icon 175. In other embodiments, a barcode label may be displayed on or with the soft trigger icon 175 to visually indicate to the operator that the barcode reading mode is currently enabled.

To operate the electronic device 100, the operator may point the device 100 at a target item and touch the trigger icon 175 on the screen 112 to initiate the scan. Once the reading event has been completed, the trigger icon 175 may alter color and/or appearance to indicate the results of the reading event. For example, the trigger icon 175 may turn green to indicate a successful scan or a "good read," or turn red to indicate an unsuccessful scan or a "bad read." Accordingly, the operator need only consult the color of the trigger icon 175 to determine whether the item was properly processed, which may be helpful in areas where sound from the device 100 may not be difficult to hear, such as in loud stores or warehouses.

In some embodiments, the floating trigger icon 175 may also be used during a scanning event to report issues that may arise. For example, when the device 100 is in a reader mode, the operator may change the functionality of the trigger icon 175 by applying a unique control gesture to the floating trigger icon 175 to activate a push-to-talk function or phone call function of the electronic device 100. Once activated, the operator may select the trigger icon 175 to place the call or use the device 100 to communicate with another party.

Figure 7:
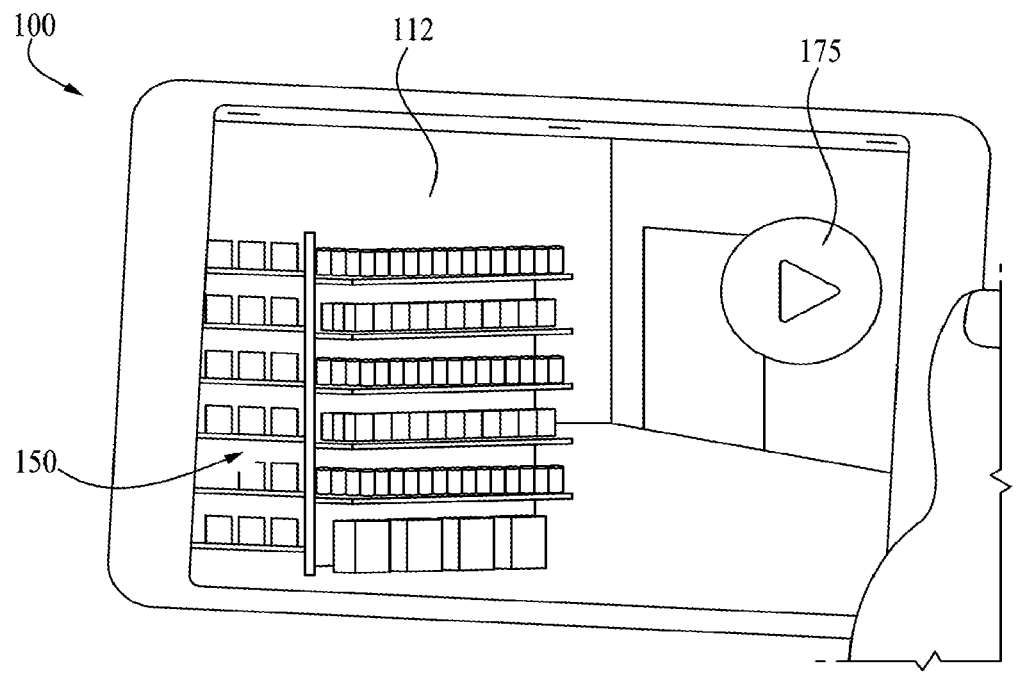
FIG. 7 illustrates a video capture mode of the portable electronic device, according to one embodiment.
Figure 8:
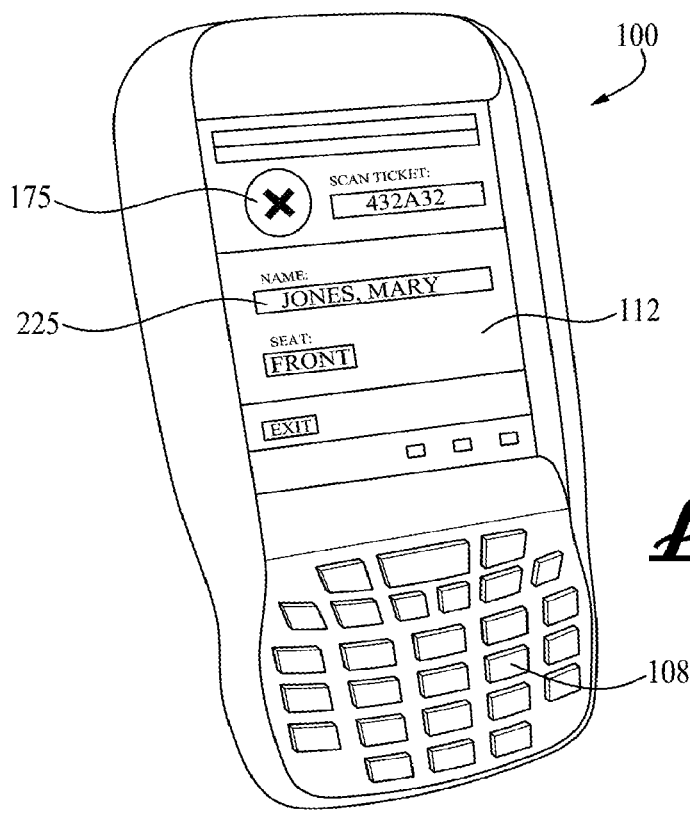
FIG. 8 illustrates a data capture mode of the portable electronic device, according to another embodiment.

FIGS. 7 and 8 illustrate two other example embodiments of the electronic device 100. With reference to FIGS. 7 and 8, the electronic device 100 includes the floating trigger icon 175 that may change appearance/color to correspond with the mode and/or selected program of the electronic device 100. FIG. 7 illustrates another embodiment of the electronic device 100 used to capture video or images. FIG. 8 illustrates one embodiment in which the electronic device 100 is used to capture transaction data, such as from scanning an event ticket.

With reference to FIG. 7, the trigger icon 175 may be selected to enable a video capture mode of the electronic device 100. As the device 100 is capturing video, the trigger icon 175 is displayed on the touch screen 112 to allow the operator to perform various functions. For example, the operator may apply various control gestures 200 to the trigger icon 175 to continue taking video, to stop the video, or to operate various playback features. If the user determines that the trigger icon 175 is obstructing the field of view, the user may select and move the trigger icon 175 at any time (e.g., while the video is recording) to any region on the screen 112 to customize the field of view in a similar fashion as described previously. For example, in the illustrated example of FIG. 7, the user may select and move the trigger icon 175 to the lower portion of the screen 112 to avoid obscuring the shot. In other embodiments, the display controller 110 may automatically alter the appearance, size, and/or location of the trigger icon 175 to minimize its impact on the field of view.

For example, when the device 100 is in video capture mode, the display controller 110 may automatically scale down the size of the trigger icon 175 so as to minimize the screen space of the trigger icon 175. In other embodiments, the display controller 110 may automatically move the trigger icon 175 to the status bar 185 or otherwise hide the trigger icon 175. To recall the trigger icon 175 on the screen 112, the user may apply a control gesture 200 (e.g., a double tap) on the screen 112 so that the trigger icon 175 returns to the last position at which it was displayed.

With particular reference to FIG. 8, the electronic device 100 includes the touch screen 112 displaying transaction data 225, a physical keypad 108 for entering or manipulating the data 225, and the floating trigger icon 175 for operating various functions of the device 100. In an example operation, the operator uses the electronic device 100 to scan a customer's ticket, such as for an event. To activate the scan, the operator may select and press the trigger icon 175 displayed on the touch screen 112. Once the scan is completed, the display 112 shows the results of scan, e.g., the transaction data 225, to the operator.

In some embodiments, the display controller 110 may alter the appearance and/or color of the trigger icon 175 to indicate whether the scan was a good read (e.g., the tickets are for the correct date and time) or a bad read (e.g., the tickets are for a different event). For example, as mentioned previously, the trigger icon 175 may turn green to indicate a good read, or turn red to indicate a bad read. In the event of a bad read, the trigger icon 175 may alter its appearance to alert the operator of the bad read and provide a prompt to allow the operator to access more information about the bad read. For example, the trigger icon 175 may change into an exclamation point icon, which the operator may select by applying a control gesture to obtain further information about the reason for the bad read. For example, the electronic device 100 may determine that the event tickets were for a different time or event date. Thereafter, the operator may apply a different control gesture to the trigger icon 175 to activate a push-to-talk feature or phone call feature of the electronic device 100 to follow up on the issue with a supervisor or other authority figure, if desired.

In still other embodiments, the trigger icon 175 may also be used for other features and functions of the electronic device 100. For example, in some embodiments, the trigger icon 175 may be used to activate data transferring features of the electronic device 100, such as printing, emailing, or otherwise transmit data from the trigger icon 175 to another computer or device. In other embodiments, the trigger icon 175 may also function as a battery status indicator of the electronic device 100. For example, the trigger icon 175 may be green when the battery life of the electronic device 100 is full. As the battery drains during use of the electronic device 100, the trigger icon 175 may change to orange, and then to red to indicate that the battery life is low and the electronic device 100 needs to be charged. Alternately, or in addition, the trigger icon 175 may also change shape intermittently to indicate battery status. For example, the trigger icon 175 may change to a flashing battery icon for a few seconds to indicate that battery is low.

In other embodiments, the trigger icon 175 may be capable of configuring the electronic device 100 into a fingerprint mode by application of a unique control gesture to the floating trigger icon 175. For example, a unique control gesture, such as a circular movement on the trigger icon 175, may alter the shape and size of the trigger icon 175 to become a wide input area having the appearance of a fingerprint to indicate to the user that a fingerprint may be captured using the electronic device 100. To capture the fingerprint, the operator or other person places a finger on the touch screen 112 at a position where the trigger icon 175 is located. In response to a user or other person touching the trigger icon 175, the electronic device 100 captures the fingerprint of the user. The fingerprint mode may also serve as a biometric locking/unlocking function of the electronic device 100.

In other embodiments, the electronic device 100 may be able to detect which finger is being used by the operator on the trigger icon 175. For example, the electronic device 100 may be able to distinguish between the use of a thumb, an index finger, or a ring finger. In such embodiments, the electronic device 100 may be enabled or configured to operate in different functions/reader modes based on the finger that is detected by the electronic device 100. For example, if the index finger is detected on the soft trigger 175, the electronic device 100 may be configured in a data reading or scan mode. If the thumb is detected on the soft trigger 175, the electronic device 100 may be configured to place a phone call. In a similar fashion as discussed in previous examples, the operator may be able to program different unique functions associated with different fingers detected on the soft trigger 175 to enable specific functions/modes of the device 100.

Figure 9:
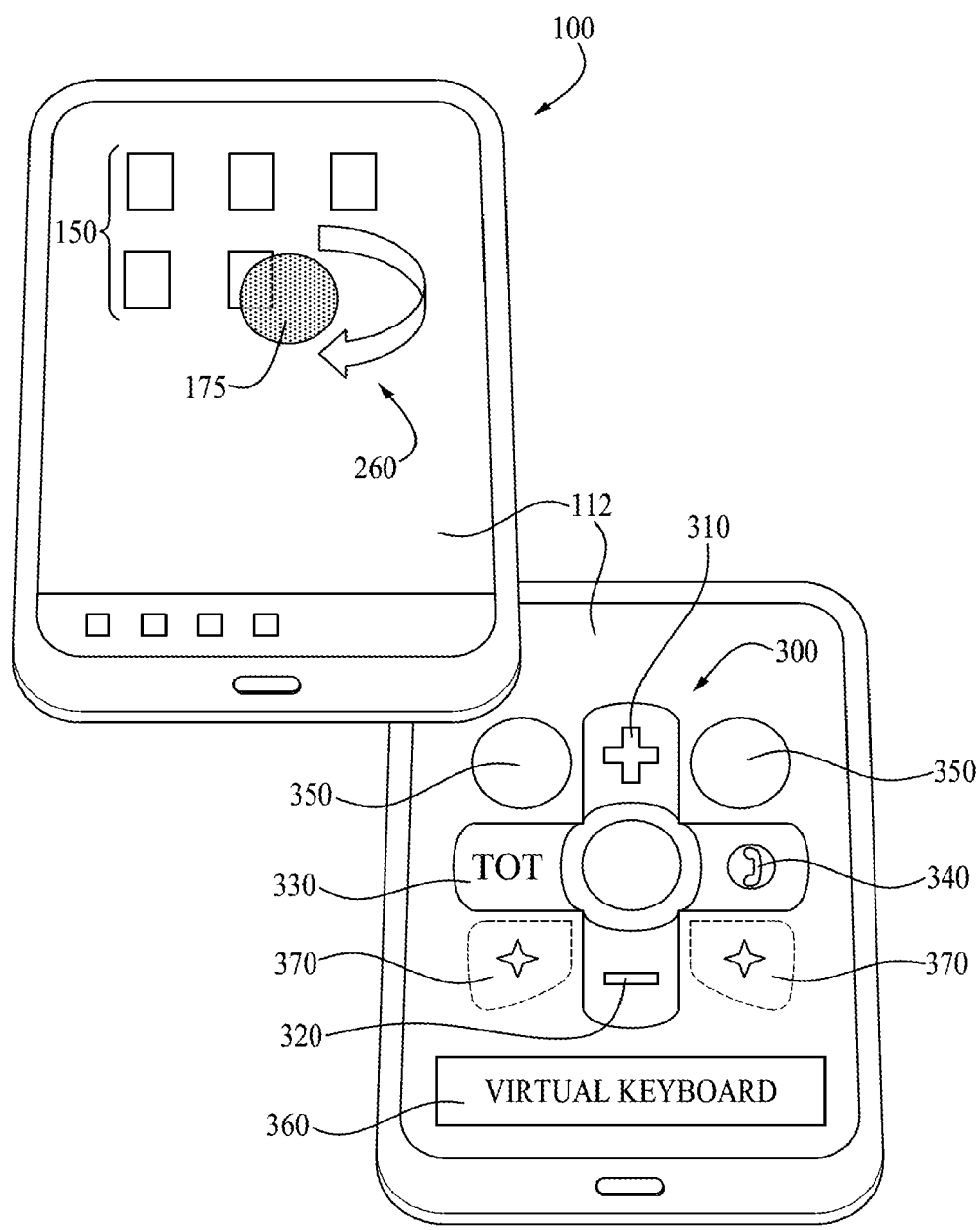
FIG. 9 illustrates a virtual joystick mode of the portable electronic device, according to another embodiment.

FIG. 9 illustrates another embodiment of the device 100 where the operator may apply a control gesture 260 to enable the trigger icon 175 to serve as a virtual joystick 300 overlaid on the screen 112 to enable multiple actions of the electronic device 100 at once for particular operating modes. In some embodiment, the virtual joystick 300 may be useful for shopping, inventory, price-checking, capturing sales on the spot, or other suitable applications. With reference to FIG. 9, the electronic device 100 includes the trigger icon 175 overlaying the information 150 on the screen 112 in a similar arrangement as described previously. Upon application of a unique control gesture 260 (illustrated as a semi-circle applied in a clock-wise motion to the touch screen 112 adjacent to or on the trigger icon 175), the virtual joystick 300 may be enabled. In some embodiments, when the virtual joystick 300 is enabled, the information 150 on the screen 112 may disappear or become hidden so that the screen 112 displays only the virtual joystick 300 and its features. In other embodiments, the information 150 may instead become transparent, minimized on the screen, moved to a docking area, or otherwise handled so that it does not obscure the use of the virtual joystick 300. Preferably, the trigger icon 175 remains displayed on the screen 112 (e.g., displayed in a center portion of the virtual joystick 300) so that the user may be able to toggle back to the desktop or home screen by applying a different control gesture.

With reference to FIG. 9, in some embodiments, the virtual joystick 300 may include an add button 310 for adding items (e.g., adding an item to a user's shopping cart or to an inventory list), a delete button 320 for deleting items, a TOT symbol 330 for obtaining an aggregate or total cost of the purchase, a phone symbol 340 for allowing the operator to place a phone call if necessary (such as to follow up on an item with a manager). The virtual joystick 300 may also include virtual indicator LEDs 350 that may display different colors to indicate the results of a scanning transaction (e.g., green for a successful read and red for an unsuccessful read). The virtual joystick 300 may include a virtual keyboard 360 for keying or entering data or other information into the electronic device 100.

In other embodiments, the virtual joystick 300 may include additional keys 370 that may be programmed by the operator to tailor the virtual joystick 300 to satisfy specific or individual needs. It should be understood that the features of the virtual trigger 300 illustrated in FIG. 9 are only meant to provide an example embodiment. In other embodiments, the virtual trigger 300 may include different features and/or may be programmable to suit the specific needs of the operator.

In other embodiments, the virtual joystick 300 may instead be used to toggle between particular data reading actions when the electronic device 100 is operating in data reading mode. For example, the user may swipe left on the virtual joystick to enable a barcode reading mode of the electronic device 100, swipe right to enable a signature capture mode, swipe up to initiate a push-to-talk feature of the electronic device 100, and/or swipe down to make a phone call using the electronic device 100. It should be understood that the device 100 may be programmed so that in other embodiments, these (or other) control gestures enable different functions of the electronic device 100 as selected by the individual users. In some embodiments, the virtual joystick may be configured as a virtual keypad or cockpit that may pop up on the screen 112 when other applications or programs of the electronic device 100 are not running, and the barcode reading mode of the electronic device 100 is being used. The virtual keypad may be used to enter additional item data or other information related to the barcode scanning process. To facilitate use, the virtual joystick/keypad may be expanded to the screen size of the electronic device 100 by applying a control gesture.

Figure 10:
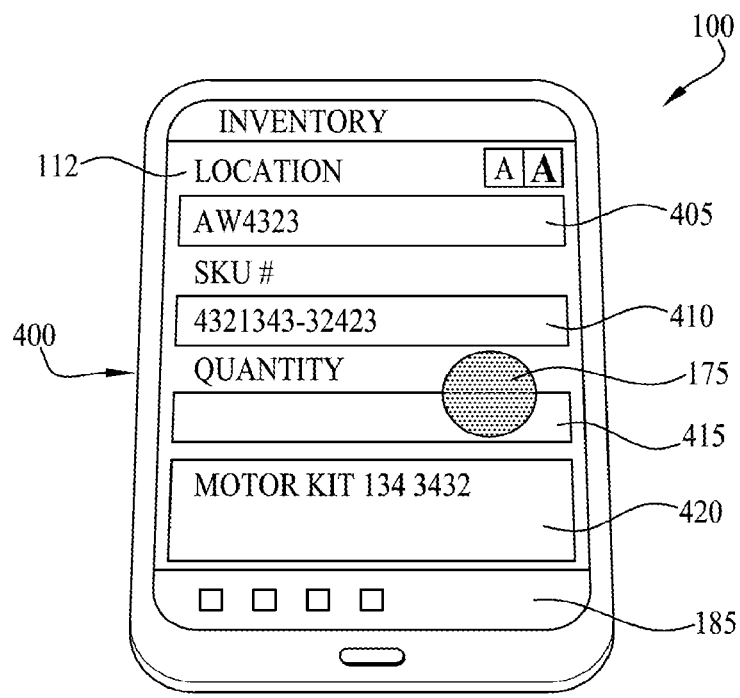
FIGS. 10 and 11 collectively illustrate a data input mode of the portable electronic device, according to another embodiment.
Figure 11:
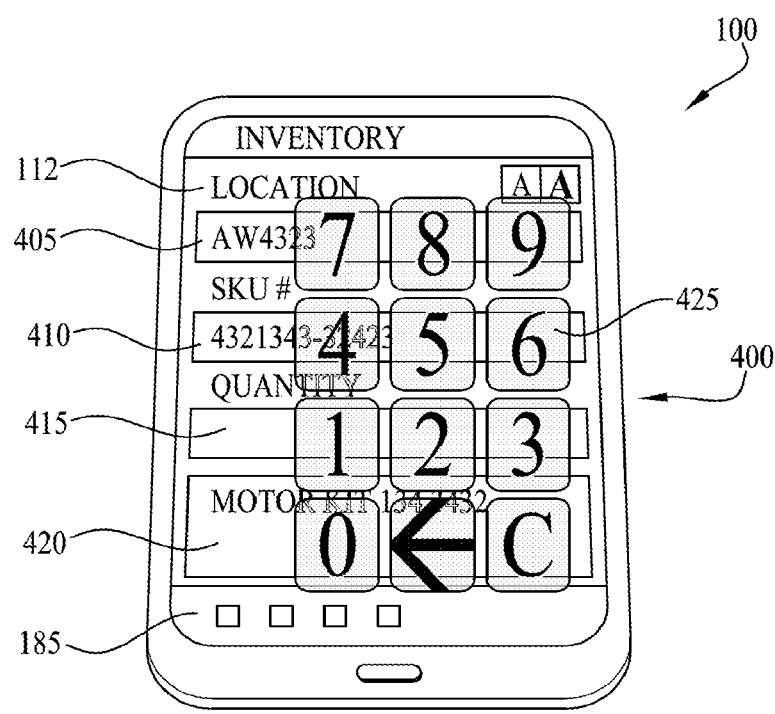

FIGS. 10 and 11 illustrate another embodiment of the device 100 where the operator may apply a control gesture (not shown, but which may be any of the control gestures illustrated in FIG. 5) on the screen 112 to select the trigger icon 175 and configure a data input mode 400 of the device 100. In some embodiments, the data input mode 400 may be useful for tracking items, such as for inventory purposes, for updating item databases or tables, or for other suitable applications.

FIG. 10 illustrates an example interface displayed on the screen 112 when the portable electronic device 100 is in a data input mode 400. With reference to FIG. 10, the screen 112 displays the trigger icon 175 overlaying a variety of input/data entry fields 405, 410, 415, 420. In a similar manner as described in previous embodiments, the trigger icon 175 may be transparent so as to avoid obscuring the data fields 405, 410, 415, 420 from the operator's view. In some embodiments, the data fields displayed on the screen 112 may include: (1) a location field 405 for inputting information relating to a location of a product, such as a shelf code, a store code, or other location identifier; (2) an SKU field 410 for inputting SKU data of the particular product for tracking/inventory purposes; (3) a quantity field 415 for inputting item quantities; and (4) a description field 420 that may be used to provide a brief description or other information about the product. It should be understood that the described data fields may be typical of certain embodiments, but other embodiments may include more, fewer, and/or different data fields as desired by the operator. As further described in detail below, the data fields that appear on the screen 112 for an individual operator may be programmed to suit the particular needs of the individual operator.

With reference to FIGS. 10 and 11, the following describes an example method/process for activating and using the data input mode 400 of the portable electronic device 100. To initiate data input mode 400, the operator may first activate the data reading mode of the device 100, such as by applying a control gesture to the trigger icon 175 in a similar fashion as described previously with reference to the embodiments of FIGS. 2-5. Once the data reading mode is configured, the operator may read a barcode or other optical label from a target item via the electronic device 100. With particular reference to FIG. 11, after the scanning process successfully reads and decodes the barcode or label from the target item, the trigger icon 175 may automatically transform or change appearance into a keypad (or keyboard) 425 that is overlaid on the data entry fields 405, 410, 415, 420 to allow the operator to input information via the keypad 425 into the specific data entry fields 405, 410, 415, 420 as desired. In some embodiments, the keypad 425 may be partially or entirely transparent to allow the operator to view the data being entered into the fields 405, 410, 415, 420 while the operator simultaneously uses the keypad 425. After the data entry is complete, the operator may apply another control gesture to complete the process, at which point the keypad 425 transforms back into the trigger icon 175 for processing of additional items.

In some embodiments, the displayed layout of the keypad 425 may be altered based on a particular control gesture that is applied to the trigger icon 175. For example, in some embodiments, a single tap on the trigger icon 175 may display a normal QWERTY keyboard layout, and a double tap on the trigger icon 175 may display a digital keypad with numbers and associated letter combinations as is used in common telephone layouts. In other embodiments, a different control gesture applied on the trigger icon 175 may transform the trigger icon 175 into a calculator to allow the operator to determine quantities or calculate other data, such as for entry in the quantity field 415. In some embodiments, the calculated amount may be automatically transferred from the calculator layout into the quantity field 415, or any other suitable field. The particular features of the keypad 425, and/or their association with particular control gestures may be programmed/configured on the electronic device 100 to suit the particular needs of an individual operator.

In other embodiments, the operator or other personnel may program different functional features of the trigger icon 175 such that the trigger icon 175 changes to activate other features of the electronic device 100 in response to application of particular control gestures. For example, in some embodiments, the trigger icon 175 may be programmed to transform into a camera icon (or other suitable icon) to operate the device 100 in a video capture mode as described previously with reference to FIG. 7. In some embodiments, videos and/or photos may be automatically transferred into an appropriate data field, such as the description field 420 during the scanning process. In other embodiments, the trigger icon 175 may be programmed to transform into other suitable icons to customize and configure the device 100, and to operate the device 100 in the data reading mode, video capture mode, data input mode, and/or joystick mode described in previous embodiments.

Figure 12:
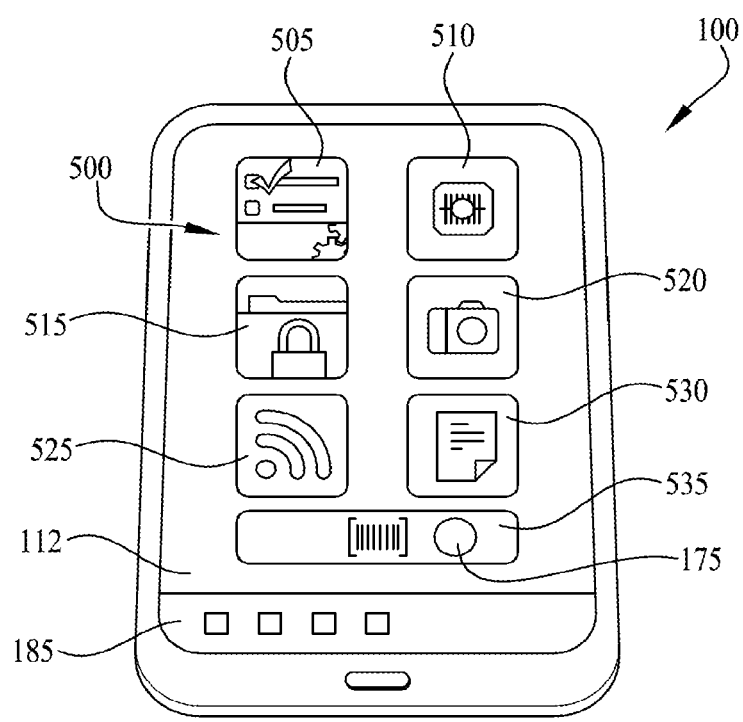
FIG. 12 illustrates an example interface menu of the portable electronic device, according to one embodiment.

FIG. 12 illustrates an example customizable soft menu 500 for configuring and enabling various features of the portable electronic device 100 and the trigger icon 175 in accordance with one embodiment. In some embodiments, the soft menu 500 may be used to configure lockdown features of the device 100, define user profiles and set preferences, define and associate specific control gestures with a specific action of the device 100, and configure other suitable features as further described below.

With reference to FIG. 12, in one embodiment, an operator may apply a unique control gesture on the screen 112 (or on the trigger icon 175) to activate a soft menu 500, illustrating a variety of options and/or tools for customizing the device 100. For example, in one embodiment, an operator may apply a sliding gesture across the screen 112 (similar to control gesture 250 illustrated in FIG. 6). After applying the sliding gesture, the soft menu 500 may be enabled and displayed on the screen 112 Preferably, the soft menu 500 is partially or entirely transparent such that it overlays other information displayed on the screen 112. However, in other embodiments, the soft menu 500 may not be transparent.

In one embodiment, the soft menu 500 may include any or all of the following icons for configuring the electronic device 100: (1) a data field configuration icon 505 for customizing the data fields or other entry boxes that may be displayed such as during the data input mode 400 of FIGS. 10-11; (2) a trigger configuration icon 510 for programming/customizing features of the trigger icon 175, such as to associate specific control gestures with specific actions of the trigger icon 175, or to select graphical characteristics of the trigger icon 175, such as size, color, and location of the trigger icon 175; (3) a lock icon 515 for controlling security and other locking features of the device 100; (4) a camera icon 520 for programming/customizing a camera and related features such as during use of the video capture mode of FIG. 7; (5) a connectivity icon 525 to configure Internet settings, Bluetooth, or other wireless settings of the device 100; and (6) a document icon 530 such as for reporting technical issues and requesting support for troubleshooting the device 100. In some embodiments, the soft menu 500 may also include a status bar 535 displaying the trigger icon 175 and other selectable icons of the device 100. In some embodiments, the trigger icon 175 may be selected from the status bar 535 to close the soft menu 500 and activate the data reading mode (or any other mode) of the device 100.

Figure 13:
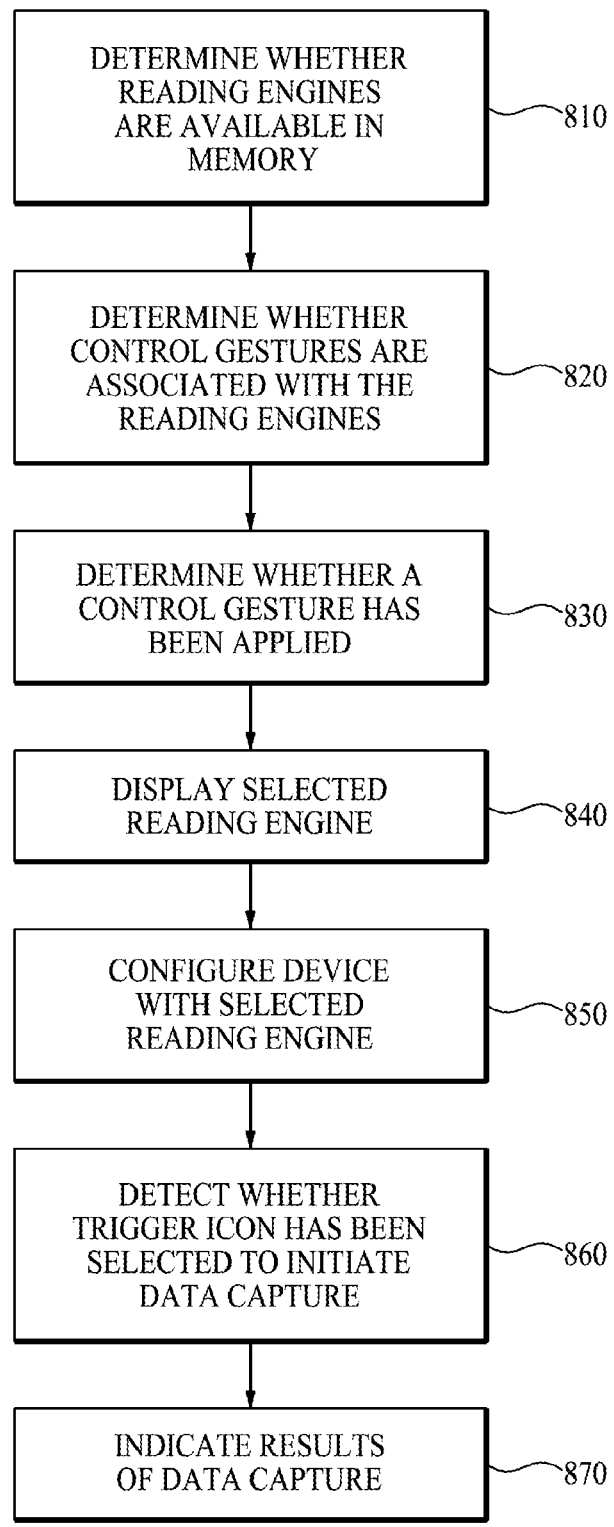
FIG. 13 is a flow chart illustrating a method for capturing data with the portable electronic device, according to one embodiment.

FIG. 13 is a flow chart illustrating a method for data reading by the portable electronic device 100 according to one embodiment. With reference to FIG. 10, at step 810 the portable electronic device 100 determines whether decoding parameters for the reading engine(s) 102 are available to the electronic device 100. To determine whether decoding parameters are available, the processing unit 104 may search memory 116, interface 122, and/or connector 109 to determine whether any decoding parameters are stored therein. The reading engines 102 may be configured with decoding parameters and filters as desired. The various decoding parameters and filters chosen may depend on the specific reading engine 102 being configured and used, such as an optical barcode scanning engine or an RFID reading engine. In some embodiments, the decoding parameters and filters may include one or more of the following: instructions for length of time to spend on decoding 1D and 2D labels and or RFID tags, instructions for reading data of a specific length, instructions for minimum and maximum acceptable length for 1D and 2D labels and RFID tags, parameters relating to label/tag prefix and postfix, decoding aggressiveness, RFID classes and other traditional symbology and/or RFID tag characteristics. These instructions may vary for each of the different reading engines 102 based on, for instance, the inherent limitations and characteristics of each data type.

Once the electronic device 100 has determined that decoding parameters for the reading engine(s) 102 are available and accessible to the electronic device 100, at step 820, the portable device 100, via the processing unit 104, determines whether corresponding unique control gestures are associated with the reading engine(s) 102 and associated decoding parameters. The portable data reader 100 may run a similar search protocol as described above with respect to step 810 to determine whether control gestures are stored therein or stored on a remote system accessible to the data reader 100. As mentioned previously, each of the reading engines 102 (e.g., 1D, 2D, RFID engines, or other decoding engines) and their associated decoding parameters, or a specific subset of decoding parameters, are assigned a unique control gesture. The control gestures allow an operator of the portable electronic device 100 to call up a specific reading engine 102 and a desired set of decoding parameters simply by applying a particular control gesture to the portable electronic device 100. The control gestures may be assigned to the reading engines 102 and decoding parameters using any suitable programming techniques. Instructions for assigning the control gestures may be programmed to the portable electronic device 100 using an input device, such as the keyboard 108, or may otherwise be loaded using a connector 109, such as through a USB device, Network Interface 114, or using the interface 122, such as through a hard disk or CD-Rom drive, or any other suitable device. As was explained previously, the control gestures 200 may be any of a single-touch gesture, a multi-touch gesture, or a unique pattern (see FIG. 5).

At step 830, the portable electronic device 100 detects or determines whether a control gesture has been applied to the touch screen 112 at a location where the floating trigger 175 is displayed. In some embodiments, the display controller 110 and/or the processing unit 104 may be configured to determine whether a stylus instrument, a finger, or other pointing device has contacted the touch screen display 112. The display controller 110 and/or processing unit 104 may be programmed to ignore intermittent or incidental contact (e.g., constant contact is not maintained for a minimum time threshold) with the touch screen display 112. In some embodiments, to simplify use of the electronic device 100, the touch screen display 112 may include a legend or other feature visible to the operator with information regarding the assigned control gestures for some or all of the reading engine 102 and decoding parameter configurations. In some embodiments, prior to applying a control gesture, the user may consult the legend or review control gesture options displayed on the touch screen display 112 to ensure that the desired option is being applied. The unique control gesture is detected by the portable electronic device 100.

In some embodiments, at step 840, the touch screen 112 may present a prompt to the operator allowing the operator to confirm or deny that the selection was properly made or received by the portable electronic device. In some instances, the operator may have erroneously applied a control gesture for a different reading engine 102 or a different set of decoding parameters than intended. In other instances, the portable data reader 100 may have misinterpreted the applied control gesture and called up the incorrect reading engine 102 or decoding parameters. In any case, if the desired mode is not selected and the operator does not wish to continue with the selected settings, the operator may communicate to the electronic device 100 that the desired mode was not selected and thereafter re-apply the control gesture to select new settings.

Once the portable data reader 100 detects or determines that a control gesture has been applied, the display controller 110 and/or processing unit 104 may communicate with the memory 116, interface 122, connector 109, or other system (e.g., a remote computer) to determine whether the detected unique control gesture corresponds with a stored control gesture for a reading engine 102 and/or specific decoding parameters. At step 850, the processing unit 104 determines the reading engine 102 that corresponds with the applied unique control gesture and configures the portable electronic device 100 in accordance with the selected reading engine 102.

At step 860, the portable electronic device 100 determines whether the trigger icon has been selected to initiate a data capture event (e.g., a barcode reading). At step 870, the portable electronic device 100 indicates whether a read was successful. In some embodiments, the portable electronic device 100 may emit a beeping sound or other good/bad read tone, or may alter a color/appearance of the trigger icon, and/or display a message on the display 112 alerting the operator of the read status.

If the read was unsuccessful, the method may revert back to step 860 or any of the previous steps to reattempt the read. If the read was successful, the portable electronic device 100 decodes the captured data based on the selected reading engine 102 and decoding parameters. Thereafter, the portable electronic device 100 may store the decoded data in any suitable medium, such as in memory 116, in internal hard drive 124, on an external input device 107, or may instead send the decoded data to another computer or device in communication with the portable electronic device 100.

It should be understood that while the steps in the method are presented and described in a particular order, the order is for convenience only and is not meant to be limiting. In some embodiments, the steps may be performed in an order different than what is specified herein. In addition, the method may include additional steps and features other than those included herein. In some embodiments, the method may combine certain steps or omit certain steps altogether. For example, the portable device 100 may not seek the operator's input confirming the selected reading mode in step 840.

Figure 14:
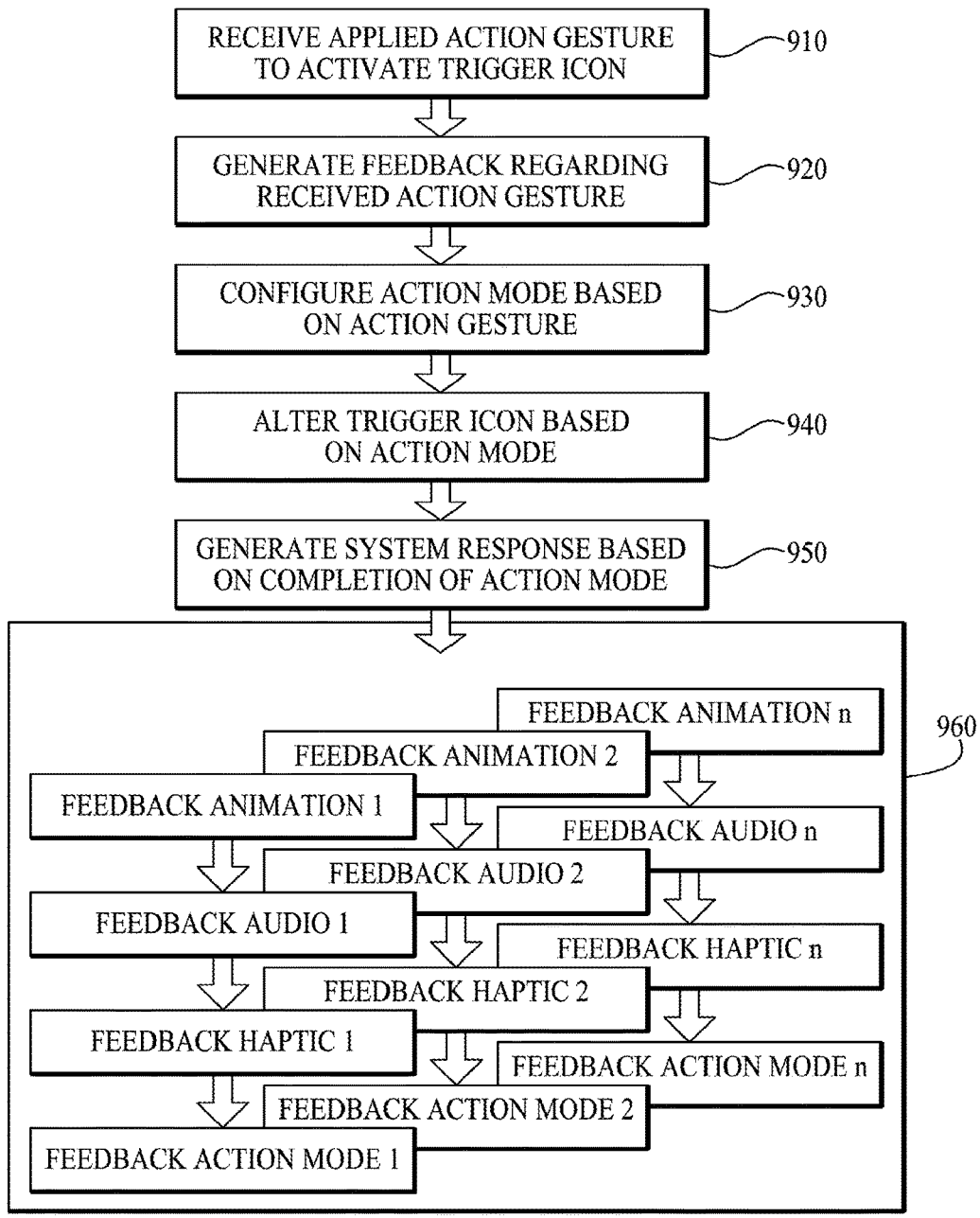

FIGS. 14 and 15 are flow charts illustrating methods for configuring and customizing features of the floating trigger icon, according to one embodiment. In some embodiments, the methods/processes described with reference to FIGS. 14 and 15 may be used to configure and customize different actions of the trigger icon 175 and/or to alter functionality of the device 100 to satisfy individualized needs for a particular operator. For example, the color, appearance, size, shape, position, behavior, and/or function of the trigger icon 175 may be customized for a particular operator and may change based on the tasks that are being performed with the device 100, such as reading data during a grocery store transaction, capturing videos, and completing inventory. In some embodiments, the described configuration/customization protocols may be made from a setting controls panel of the device 100, via a software development kit, during selection of an action via the device 100, and/or via other suitable mechanisms.

With reference to FIG. 14, the following describes example processes for configuring/using the trigger icon 175 of the device 100. With reference to FIG. 14, at step 910, the operator applies an action/control gesture to activate the trigger icon 175 displayed on the screen 112 to configure a device action. The control gesture may be any of the control gestures described previously in FIG. 5. In response to application of the control gesture on the screen 112, at step 920, the device may communicate to the operator that the control gesture has been received and identified. For example, in some embodiments, the device may display an action animation on the screen 112. The action animation may be any graphical behavior, such as a change in appearance, color, and/or size of the trigger icon 175. In some embodiments, the device 100 may also (or alternatively) generate action audio, such as an audible sound or tone, and/or an action haptic response, such as a minor vibration of the device. In other embodiments, the device may take other suitable actions.

At step 930, in response to selection of the trigger icon 175, the associated action is configured for the device 100. For example, the action may be a data reading mode, or a video capture mode, or an inventory mode, launching a customer application, displaying a field box for database lookup, or any other suitable mode. In some embodiments, at step 940, the device 100 may alter the characteristics and functionality of the trigger icon 175 based on the configured action. For example, if the selected action is to launch a data reading application, and the application successfully launches, the device 100 may automatically alter the trigger icon 175 to switch to a barcode scanning mode, where selection of the trigger icon 175 activates or engages the scanning event.

Thereafter, at step 950, the device 100 generates a response based on completion of the selected action mode. For example, in a data reading mode, the device 100 may indicate on the screen 112 that the reading event was successful. At step 960, the device 100 provides feedback to the operator to communicate the result of the configured action based on the system response. In some embodiments, the feedback may be configured or programmed to suit the preferences of each individual operator. For example, the screen 112 may display a feedback animation graphic to indicate whether the reading event was or was not successful. In one embodiment, the screen 112 may display the animation of a star burst centered on the trigger icon 175 when a barcode is successfully read by the device 100, or display an expanding sphere on the trigger icon 175 when the device 100 times out or does not successfully read the barcode. In other embodiments, the feedback may include a haptic response, such as a vibration of the device 100 to indicate that the read was or was not successful.

It should be understood that while the steps in the method are presented and described in a particular order, the order is for convenience only and is not meant to be limiting. In some embodiments, the steps may be performed in an order different than what is specified herein. In addition, the method may include additional steps and features other than those included herein. In some embodiments, the method may combine certain steps or omit certain steps altogether.

FIG. 15 is a flow chart of a timing sequence illustrating a system response based on selection and activation of the trigger icon 175 as described in the method of FIG. 14. With reference to FIG. 15, at time $T_1$, the action gesture is applied to the screen 112 to configure an initial action mode of the device 100. As mentioned previously, the action mode may be a data reading mode, video capture mode, or other suitable modes such as those described previously. Thereafter, at time $T_2$, an action animation, action audio, and/or action haptic response are transmitted to the screen 112, speakers, and/or sensors to communicate to the operator that the device 100 is appropriately configured based on the applied action gesture. After the selected action mode is performed via the device 100 (e.g., a data reading event is completed), at time $T_3$, the operating system or other application transmits a system response relating to the results of the selected action. Finally, at time $T_4$, feedback animation, feedback audio, and/or feedback haptic response is transmitted to the screen 112, speakers, and/or sensors of the device 100 to communicate to the user the results of the action mode. As mentioned previously, the feedback animation, audio, and haptic response may be configured to be dependent on the specific system response for the specific action mode.

It is intended that subject matter disclosed in any one portion herein can be combined with the subject matter of one or more other portions herein as long as such combinations are not mutually exclusive or inoperable. In addition, many variations, enhancements and modifications of the concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. An electronic data reading device comprising:
   a housing adapted for handheld operation;
   a data capture system adapted for capturing data from an item located external to the housing;
   a touch screen supported on the housing and configured to display information thereon, the touch screen including a touch screen surface having one or more sensors configured to detect an application of one or more unique control gestures on the touch screen surface; and
   a processing system in operable communication with the data capture system and the touch screen, the processing system configured to:
   display a floating trigger icon on the touch screen wherein the floating trigger icon is movable about the touch screen and configured as an access point for allowing the operator to:
      configure a plurality of different operational modes, including a data capturing operational mode and a data input operational mode, of the electronic data reading device responsive to different unique control gestures detected by the processing system as applied to the floating trigger icon by the operator;
      initiate a data capturing action by the data capture system for a selected data capturing operational mode of the electronic data reading device responsive to a first corresponding unique control gesture applied to the floating trigger icon by the operator during the selected data capturing operational mode; and
      initiate a data input action for receiving data input from the operator responsive to a second corresponding unique control gesture applied by the operator during a selected data input operational mode,
   wherein the floating trigger icon is configured to alter its appearance from a first graphic appearance to a different second graphic appearance indicative of a selected operational mode of the plurality of different operational modes responsive to application of the first or second corresponding unique control gesture, and wherein the electronic data reading device is configured to generate response feedback based on the completion status of an action of the selected operational mode.

2. The electronic data reading device of claim 1, wherein the floating trigger icon is further selectable to configure a keyboard of the electronic data reading device by applying a third corresponding unique control gesture to the floating trigger icon when in the selected data input operational mode.

3. The electronic data reading device of claim 2, wherein the floating trigger icon automatically transforms into the keyboard upon application of the third corresponding unique control gesture for the selected data input operational mode.

4. The electronic data reading device of claim 2, wherein the keyboard is transparent and overlays at least a portion of the information displayed on the touch screen.

5. The electronic data reading device of claim 1, wherein the first graphic appearance and the second graphic appearance differ in at least one of a graphic, color, size, or combination thereof.

6. The electronic data reading device of claim 1, wherein the selected operational mode is one of a data reading mode, a video capture mode, a data input mode, a joystick mode, a customer application mode, or a database lookup mode.

7. A method of capturing data from an item with an electronic data reading device having a touch screen, a processing system, and data capture device, the method comprising:
    displaying, by the processing system, a floating trigger icon on the touch screen of the electronic data reading device, the floating trigger icon configured as an access point for allowing the operator to configure a plurality of different operational modes of the electronic data reading device responsive to different unique control gestures detected by the processing system as applied to the floating trigger icon by the operator;
    moving, by the processing system, the floating trigger icon to different locations on the touch screen responsive to a first corresponding unique control gesture applied to the floating trigger icon;
    detecting, by the processing system, application of a second corresponding unique control gesture at the floating trigger icon;
    altering, by the processing system, a displayed appearance of the floating trigger icon from a first graphic appearance to a different second graphic appearance indicative of a selected operational mode of the plurality of different operational modes responsive to application of the second unique control gesture;
    determining, by the processing system, a data capturing action that corresponds with the second corresponding unique control gesture;
    configuring, by the processing system, the electronic data reading device to perform the data capturing action;
    triggering, by the processing system, the data capturing action; and
    generating response feedback based on completion status of the data capturing action according to the selected operational mode.

8. The method of claim 7, wherein altering the displayed appearance includes configuring a keyboard of the electronic data reading device in response to detecting the second corresponding unique control gesture applied at a first region of the touch screen at which the floating trigger icon is displayed.

9. The method of claim 8, wherein the keyboard is transparent and overlays at least a portion of information displayed on the touch screen.

10. The method of claim 7, further comprising automatically transforming the floating trigger icon into a keyboard responsive to completion of the data capturing action to enable further data entry associated with the item by the operator.

11. The method of claim 10, further comprising automatically transforming the keyboard back into the floating trigger icon responsive to completion of the further data entry and detection of another unique control gesture.

12. The method of claim 7, further comprising automatically transforming the floating trigger icon into a calculator responsive to detection of another unique control gesture.

13. A method of capturing data with an electronic data reading device having a touch screen and a processing system, the method comprising:
    displaying, by the processing system, a floating trigger icon on the touch screen of the electronic data reading device, the floating trigger icon configured as an access point for allowing the operator to configure a plurality of different action modes of the electronic data reading device responsive to different unique control gestures detected by the processing system as applied to the floating trigger icon by the operator;
    moving, by the processing system, the floating trigger icon to different locations on the touch screen responsive to a first corresponding unique control gesture applied to the floating trigger icon;
    detecting, by the processing system, application of a second corresponding unique control gesture at a region of the touch screen at which the floating trigger icon is displayed;
    altering, by the processing system, a displayed appearance of the floating trigger icon from a first graphic appearance to a different second graphic appearance indicative of a selected action mode of the plurality of different action modes responsive to application of the second corresponding unique control gesture;
    generating, by the processing system, action feedback based on the second corresponding unique control gesture;
    configuring, by the processing system, the electronic data reading device to perform an action associated with the selected action mode;
    generating, by the processing system, a system response based on a completion status of the selected action mode; and
    generating, by the processing system, response feedback based on the completion status of the selected action mode.

14. The method of claim 13, further comprising altering the floating trigger icon based on the selected action mode.

15. The method of claim 13, wherein the response feedback includes an animation response.

16. The method of claim 13, wherein the response feedback is based on the selected action mode.

17. The method of claim 13, wherein the action feedback is programmable for each action mode of the plurality of different action modes.

18. The method of claim 13, wherein the response feedback is programmable for each action mode of the plurality of different action modes.

19. The method of claim 13, wherein the response feedback includes an audio response.

20. The method of claim 13, wherein the response feedback includes a haptic response.

* * * * *